Figure 5:
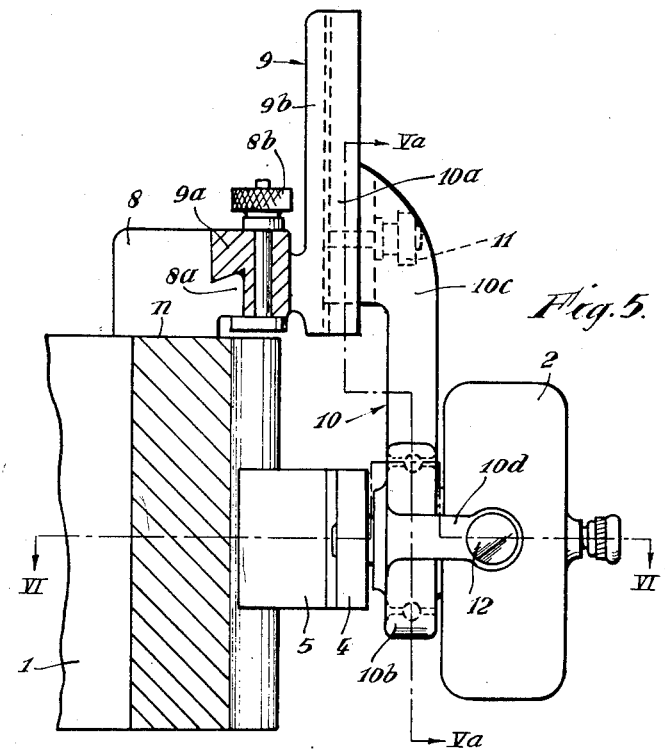

Dec. 21, 1954  B. LEUTHOLD  2,697,283
DEVICE FOR MEASURING THE LEAD ANGLE
OF THE TEETH OF SCREW WHEELS
Filed May 27, 1947  4 Sheets-Sheet 1
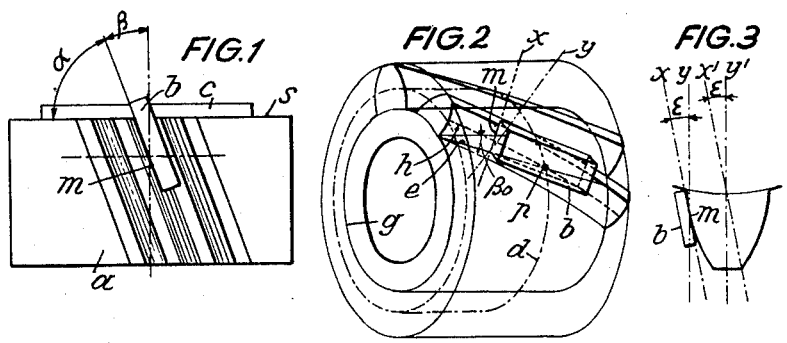
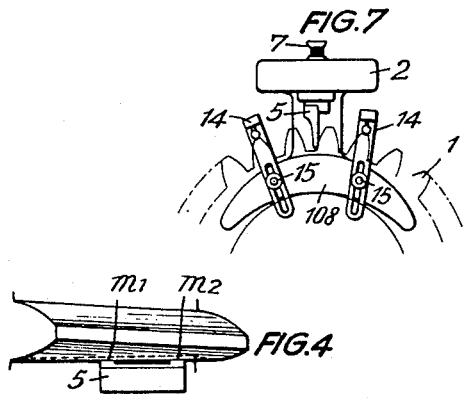
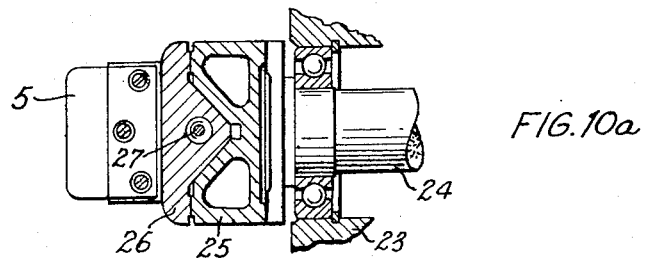
Inventor
Benedikt Leuthold
By Fraser, Myers & Manley
Att'ys Benedikt Leuthold
By Churchill, Rich, Weymouth & Engel
Attys.

Dec. 21, 1954

B. LEUTHOLD 2,697,283

DEVICE FOR MEASURING THE LEAD ANGLE
OF THE TEETH OF SCREW WHEELS

Filed May 27, 1947

4 Sheets-Sheet 3

Benedikt Leuthold
By Churchill, Rich, Weymouth & Engel
Attys.

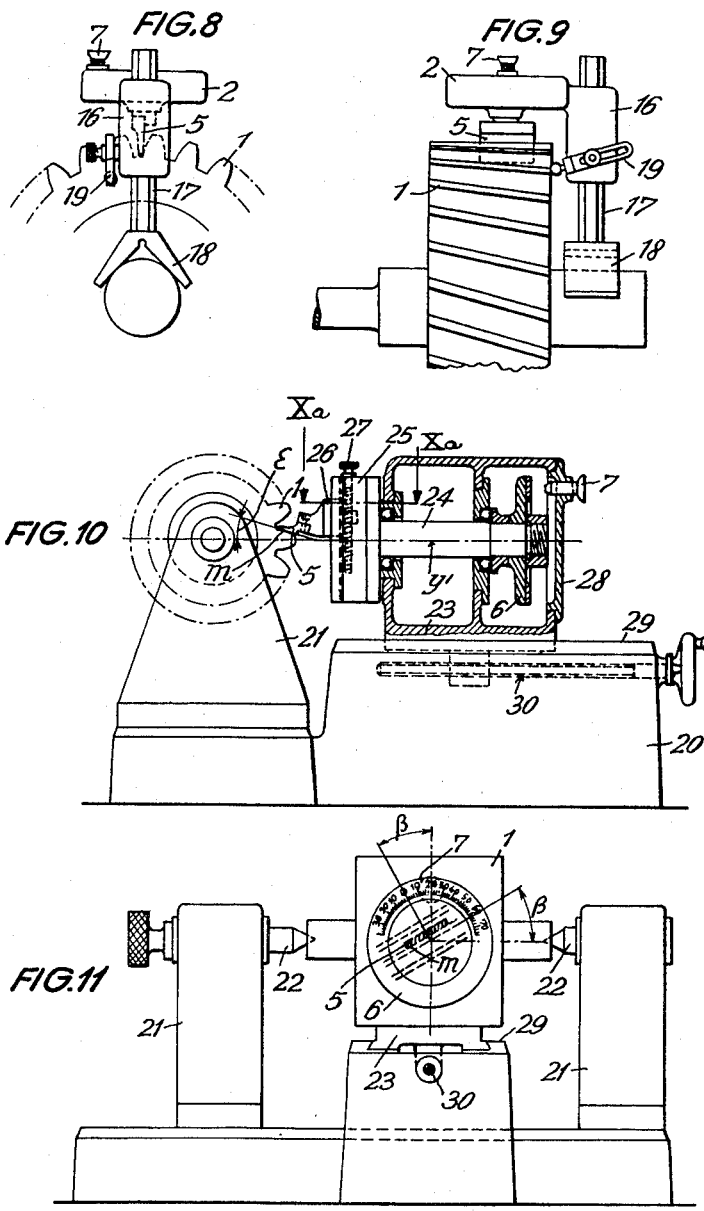

United States Patent Office 2,697,283
Patented Dec. 21, 1954

2,697,283

DEVICE FOR MEASURING THE LEAD ANGLE OF THE TEETH OF SCREW WHEELS

Benedikt Leuthold, Zurich, Switzerland, assignor to Maag Zahnräder und Maschinen, A. G., Zurich, Switzerland, a body corporate of Switzerland Application May 27, 1947, Serial No. 750,702

18 Claims. (Cl. 33—179.5)

This invention relates to devices for measuring the lead angle of the teeth of screw wheels, which latter term as herein used means any wheel serving for the transmission of motion and having teeth of helical form and includes helical gear wheels (i. e. wheels of gears having their axes parallel and co-planar), spiral gear wheels or screw wheels proper (i. e. wheels of gears having their axes at any angle and in different planes), as well as racks (of rack-and-pinion gearings) having inclined teeth, such racks being considered as wheels of infinitely large radius. The term "lead angle" refers to the lead or pitch of the helices of which the teeth form part, as opposed to the pitch of the teeth, and means therefore the angle of slope or inclination of the teeth with respect to the wheel axis, also sometimes called "helix angle" or "pitch angle." In relation to racks, "wheel axis" means its obvious equivalent, i. e. a plane normal to the longitudinal plane of the rack. However, the terms "pitch circle" "pitch cylinder" and "diametral pitch" hereinafter used have references to the pitch of the teeth, being taken, in common with other similar terms, from the nomenclature of the design of gear teeth.

Such measuring devices have already been previously proposed. In one such prior proposal, a feeler is moved along a helical tooth of a wheel whereby the course of the helix, on the one hand, and its lead angle, on the other, are measured. In another known device, determination of the lead angle is effected by placing a feeler in contact with the flank of a tooth, and first displacing the feeler by a predetermined, known distance parallel to the wheel axis and then rotating the wheel until the feeler is again in contact with the flank, the data thus obtained enabling the lead angle to be calculated.

It is an object of the present invention to provide an improved measuring device enabling direct indication of the lead angle of the teeth of screw wheels to be obtained.

Another object of the invention is to enable such measurement to be made quickly and easily, and without involving calculations.

A further object is to provide a reliable measuring device of this kind which is yet of simple construction and capable of being comparatively cheaply manufactured.

Other objects and advantages of the invention will become apparent from the description, which will be hereinafter given, of a few embodiments thereof taken in connection with the accompanying drawings. Although no embodiment illustrating the application of the invention to racks is specifically described, it will be seen from the description hereinafter that some of the measuring devices described are obviously, and without any appreciable modification thereof, applicable to racks, and no separate description of such application is considered necessary.

The invention in all its embodiments, essentially comprises protractor means consisting of a stationary and a relatively movable indicating element, the movable element being mounted and connected for joint rotation with a feeler having a plane measuring surface adapted, by rotation of feeler and movable element with respect to the screw wheel axis, to be brought to bear against the flank of a tooth of the screw wheel along a line of contact thereof, the protractor means thus indicating the angle of rotation which is the lead angle to be measured.

Figure 5A:
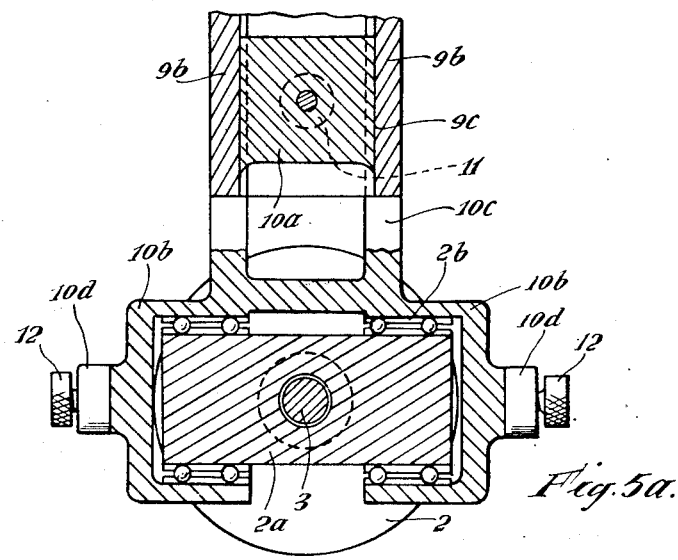
Figure 6A:
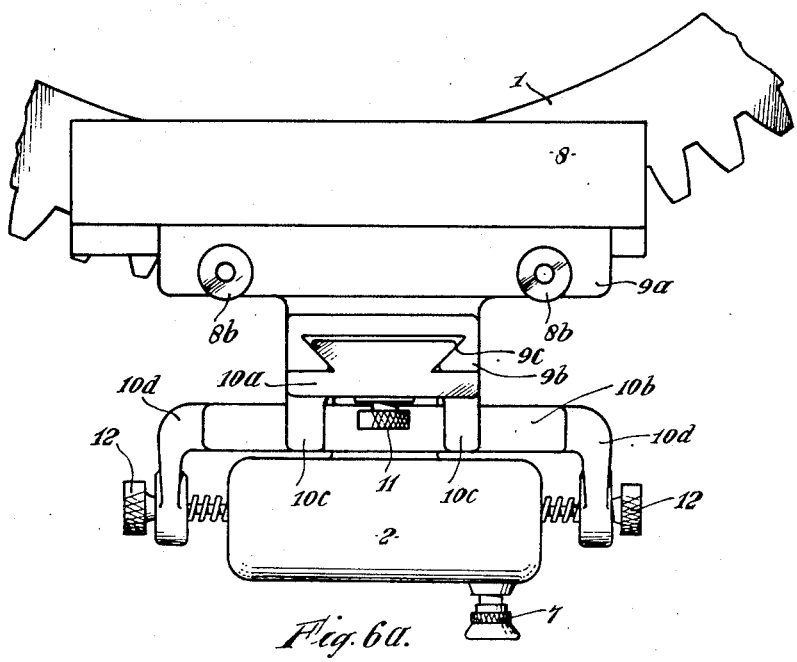
Figure 6:
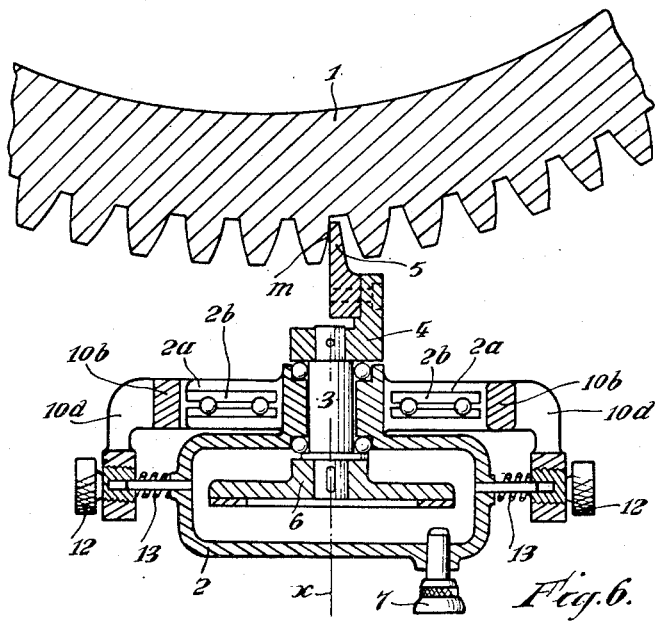

In the accompanying drawings,

Figs. 1–3 are diagrammatic views illustrating the principle of the invention in its simplest form, Fig. 4 is a perspective view onto the top of a tooth, showing one form of feeler and its measuring surface, Fig. 5 shows a part-sectional side elevation of a form of portable device for large screw wheels, Fig. 5a is a section of the device shown in Fig. 5 taken on the line $V_a$—$V_a$ thereof, Fig. 6 is a section of the device shown in Fig. 5, the section being taken on the line $V_1$—$V_1$ of Fig. 5, Fig. 6a is a top plan of the device shown in Fig. 5, Fig. 7 is an elevation of another embodiment, having a modified form of rule for attachment to the end face of the wheel, Fig. 8 shows a similar view of a further embodiment in which the rule is replaced by a V-shaped abutment positioned on the wheel shaft, Fig. 9 is a side elevation of the form of device shown in Fig. 8, Fig. 10 is a part-sectional side elevation of a stationary device for small wheels, Fig. 10a is a section taken along the line $X_a$—$X_a$ of Fig. 10, and Fig. 11 is a front view of the device shown in Fig. 10.

Throughout the several embodiments illustrated in Figs. 5 to 11, the same reference characters have been used to denote like or analogous parts.

Figs. 1 to 3 show the invention diagrammatically in its simplest form and the principles underlying the methods of measurement with the aid thereof. Fig. 1 represents a view onto the peripheral surface of a screw wheel $a$ showing some of the helical teeth thereof. A feeler $b$ having a plane measuring surface $m$ is so placed alongside one of the teeth that the measuring surface $m$ bears against the flank of the tooth. This measuring surface so positioned forms one side enclosing the lead angle $\beta$ to be measured, the other side being the axis of the wheel. If it is not convenient to use the wheel axis itself as a standard of reference, then its place is taken by some part of the wheel having a known, fixed relation to the wheel axis, e. g. one of the end faces $s$ of the wheel, against which a subsidiary feeler in the form of a rule $c$ is placed. The feeler $b$ is rotatable with respect to the rule or subsidiary feeler $c$. The measuring surfaces of the two feelers enclose between them the angle $\alpha = 90° - \beta$, but for the sake of simplicity and ease in handling the device, the protractor means which is provided to indicate the angle, but is not shown in Figs. 1–3, will normally be so arranged that the actual reading given by it is $\beta = 90° - \alpha$, i. e. that it indicates 0° when the surface $m$ is parallel to the wheel axis.

As is well-known, the surface of a helical tooth of involute section can be generated by placing on the base cylinder $g$ (Fig. 2) a line $e$ at an angle $\beta_0$ to the axis of the cylinder $g$ and performing the familiar involute generating motion of unrolling or unwrapping it from the surface of the cylinder while maintaining it inclined at this angle. Upon being raised from the cylinder surface in the course of this motion, this line $e$ becomes a straight line which is the line known as "the line of contact," being the line along which two conjugate teeth will be in contact at any moment, and which extends at an angle across the flank of the tooth from near the root (base circle level) to the tip. The surface of the tooth flank can be visualized as made up of an infinite number of parallel lines of contact which are the straight lines along which any imaginary plane surface which is tangent to the base cylinder would intersect the surface of the tooth flank. It will also be remembered as a geometrical fact that the line of intersection of the tooth surface with any imaginary cylindrical surface concentric with the base cylinder is a helix and that, as all such helices have the same lead, the lead angles of these helices differ from each other according to the diameter of the cylindrical surface considered, the lead angle of the helix determined by intersection with the base cylinder itself being the smallest lead angle (hereinafter called "the lead angle at base circle level"). It will be seen from the foregoing that, if the feeler $b$ is placed against the flank of the tooth, then its measuring surface $m$ is always in the plane of one such line of contact $e$, and if the rotation of the feeler $b$ takes place about an axis $x$ contained in the plane at the measuring surface $m$, then the angle enclosed between it and the wheel axis and indicated by the protractor means regardless of what part of the tooth flank surface is contacted by the surface $m$ is always the same angle $\beta_0$ at the level of which is of course the lead angle at base circle level. The same result is obtained if the axis of rotation of the feeler $b$, whilst being parallel with the measuring surface $m$, is not disposed in the same plane, as in the case of the axis $x'$ (Fig. 3). If however the axis of rotation forms an angle with the measuring surface $m$, as do the axes $y$ or $y'$ in Fig. 3 in which this angle is designated by $\epsilon$, and if this angle $\epsilon$ is equal to the pressure angle of the tooth measured at the pitch circle $d$ (Fig. 2) on a tooth section taken normal to the helix of the tooth, then the angle enclosed by the two feelers and indicated by the protractor means is equal to the lead angle $\beta$ at the level of the pitch circle. This is explained as follows: let the point $p$ in Fig. 2 be the point of intersection of the pitch circle $d$ with the line of contact $e$ and the helix $h$; then the measuring surface $m$ of the feeler $b$ in the point $p$ must be in the plane both of the tangent to the helix $h$ (i. e. at the level of the pitch circle or cylinder $d$) and of the tangent to the helix at base circle level, and as rotation of the measuring surface takes place about an axis $y$ or $y'$, which is in a plane perpendicular to the wheel axis, the angle of rotation of the measuring surface equals the lead angle $\beta$ of the helix at the level of the pitch circle ($d$).

As shown in Fig. 4, in an actual construction the measuring surface of the main feeler in contact with the tooth, here designated by 5, may be discontinuous and composed of the combination of two plane and parallel strips $m_1$ and $m_2$ in order to obtain satisfactory contact thereof with the tooth flank. If desired, the measuring surface could of course be made up of more than two such parallel strips. In considering the embodiments hereinafter to be described, no particular reference will be made to the shape or construction of the feeler, denoted throughout by the reference numeral 5, but it will be appreciated that its construction, as regards the measuring surface, may be either as shown in Fig. 4 or otherwise as found expedient.

The embodiment shown in Figs. 5a, 6 and 6a is a portable measuring device for a large screw wheel 1. Mounted in a casing 2 is a shaft 3 provided at one end with a bracket 4 to which the feeler 5 is secured. The axis $x$ of the shaft 3 lies in the plane of the measuring surface $m$ of the feeler 5. Attached to the other end of the shaft 3 is a disc 6 bearing an accurately graduated protractor circle forming the movable element of the protractor means. The angle of rotation of the disc 6 can be read through a microscope 7 by means of a reference mark or line provided thereon and forming the stationary element of the protractor means. The positioning of the latter with respect to the wheel axis is effected by means of a rule or abutment 8 placed and held in position against one of the plane end faces of the wheel, presuming it to be exactly normal to the wheel axis. The rule 8 is a subsidiary feeler and has a plane surface $n$ for contact with the end face of the wheel. The rule 8 is provided with a guide rib 8a which is slidably engaged by a corresponding guide portion 9a of a slide generally designated 9 so that the latter is adjustable along the rule 8 in a direction parallel to the end face of the wheel. By means of clamping screws 8b the slide 9 can be secured in any position to which it has been adjusted with respect to the rule 8. Another portion 9b of the slide 9 is provided with a guideway 9c which is slidably engaged by a corresponding guide portion 10a of a slide frame generally designated 10 so that the latter is adjustable with respect to the slide 9 in a direction parallel to the axis of the wheel. By means of a clamping screw 11 the slide frame 10 can be secured in any position to which it has been adjusted with respect to the slide 9. The slide frame 10 further comprises a forked portion consisting of two fork limbs 10b each of which is of channel-section as shown in Fig. 5a, so that together they form a box-section in which is slidably mounted an elongated guide member 2a secured to, and projecting in opposite directions from, the neck part of the casing 2, i. e., the part providing the bearing for the shaft 3. For this purpose the external faces of the guide member 2a and the adjacent internal faces of the channel-section fork limbs 10b are provided with linear ball races for ball bearings 2b. The forked portion of the slide frame 10, consisting of the limbs 10b is connected to the guide portion 10a of the slide frame by an arm consisting of two spaced webs 10c. Also forming part of the slide frame 10 are two extensions 10d of the fork limbs 10b, respectively; the extensions 10d project from the external faces of the limbs 10b towards opposite sides of the casing 2, the latter being slidably guided in axial holes provided in two screws 12 which are screwed into the ends of the extensions 10d, respectively, and act on two springs 13 respectively abutting on the casing 2. In this way it is possible, by slackening one and tightening the other of the screws 12, to effect a lateral displacement of the casing 2 relatively to the slide frame 10, with the guide member 2a sliding relatively to the forked slide portion 10b in the linear ball bearings 2b. This arrangement provides a fine adjustment of the casing 2 in the direction parallel to the end face of the wheel 1.

Measurement of the lead angle is carried out by placing the plane surface $n$ of the rule or abutment 8 against the end face of the wheel where it may be held in position against movement by the hand or by screws or weights or in any other convenient way. This is best done with the slide 9 completely detached from the rule 8, and before attaching it the slide frame 10 is adjusted along the slide 9 and fixed in a position thereon which will determine the eventual distance between the feeler 5 and the rule 8 to be such as to insure that measurement can take place at a convenient part of the tooth flank. The slide 9 is then engaged upon the rule 8 and moved along it until the feeler 5 nearly touches the flank of the tooth to be measured, in which position the slide 9 is fixed. The casing 2 is then moved to the left, as viewed in Fig. 6a, by operation of the screws 12 until the measuring surface $m$ of the feeler 5 bears against the tooth flank with light pressure, which will cause the surface $m$ to place itself in the plane of a line of contact and, in doing so, it will rotate the shaft 3 whereupon the lead angle $\beta_0$ at base circle level is indicated against the reference line or mark and can be read through the microscope 7.

A different kind of rule for bearing against the end face of the wheel is included in the embodiment shown in Fig. 7. The rule, here denoted by 108, is similar in shape to that of a segment of a circle. In this case, the casing 2 with its protractor means and feelers is immovably connected direct to the rule 108, thus reducing the number of parts and decreasing the weight of the device. In order to enable true positioning of the rule 108 on the end face of the wheel to be obtained, the rule is provided with supports 14 which engage the tips of two gear teeth and are adjustable with respect to the rule 108 by means of a pin-and-slot engagement adapted to be secured by means of nuts 15.

Figs. 8 and 9 show a similar portable device, in which however the relation of the stationary element of the protractor means to the wheel axis is determined by the latter itself, the rule or subsidiary feeler provided in previous embodiments for engagement with the end face of the wheel being in this case replaced by an abutment member positioned on the wheel shaft. For this purpose, a guide bracket 16 is secured to the casing 2 of the device, and through it passes a rod 17 which is splined therein and can be displaced endwise without having lateral play therein. The lower end of this rod 17 has attached to it the abutment member which is in the form of a V-shaped base 18 for engagement with the wheel shaft in such a way that, when the splined rod 17 is displaced, the base 18 does not undergo any rotation with respect to the guide bracket 16. A supporting lever 19, adjustably mounted on the guide bracket 16 as shown in Fig. 9, cooperates with the adjacent end face of the wheel so as to hold the device in position on the wheel. As in the previous embodiments, the axis of rotation of the movable protractor element is parallel with the measuring surface of the feeler 5, so that the lead angle $\beta_0$ at base circle level is indicated by the device.

Whereas the embodiments so far described relate to portable devices, the embodiment shown in Figs. 10, 10a and 11 is mainly intended for smaller wheels, which can be conveniently taken to the measuring device, the latter being accordingly constructed with means, including a frame, for supporting the screw wheel. A bed 20 comprises two adjustable supports 21 having centres 22 between which a shaft carrying the gear wheel 1 is adapted to be rotatably mounted without play. The bed 20 is also provided with a slide-way 29 upon which a casing 23 is displaceable in a plane perpendicular to the gear wheel axis by hand-wheel operation of a screw spindle 30 engaged by the casing. Rotatably mounted in the casing 23 is a shaft 24 which carries at one end a disc 6 bearing a protractor circle. On the other end the shaft 24 carries a flange 25 engaged by a slide 26 which by means of a screw 27 is displaceable thereon in a plane perpendicular to the axis of the shaft 24. The slide 26 carries the feeler 5 formed or provided, as in previous embodiments, with a plane surface $m$. The casing 23 is closed at one end by a lid 28 which contains a microscope 7 with a reference mark or line constituting the stationary element of the protractor means. In the case of this embodiment, the axis of rotation $y'$ of the movable protractor element 6 forms an angle $\epsilon$ with the measuring surface $m$. This angle is preferably made equal to the angle of obliquity of the screw wheel teeth, measured on a tooth section taken normal to the helix forming the tooth. For example, the angle $\epsilon$ may be made 15°, where the majority of the gear wheels to be tested with the device are likely to have a "normal" angle of tooth obliquity of 15°, and in that case the reading given by the instrument will be the lead angle $\beta$ at the level of the pitch circle.

Measurement is effected by first advancing the casing sufficiently far in the slide-way 29 for the feeler 5 to engage to the required depth into the space or gap between two teeth of the gear wheel. The latter is then rotated by hand until the adjacent tooth flank bears hard against the measuring surface $m$, whereby the latter, and with it the disc 6 and its protractor circle, are rotated through the angle $\beta$. The reference mark or line of the microscope 7 is arranged to coincide with the 0° division line of the protractor circle (Fig. 11) when the measuring surface $m$ is exactly parallel with the screw wheel axis. The necessity for displacement of the slide 26 on the flange 25 arises out of the varying tooth thicknesses of different wheels which may have to be measured, depending upon the modulus or diametral pitch thereof. This displacement also enables the lead angle to be checked over the whole range between root or base circle and addendum circle of a tooth. If the lead angle on the other side of the tooth is to be checked, the casing 23 is retracted until the feeler 5 is clear of the wheel, and the shaft 24 is then rotated by 180°, whereupon the process previously described is repeated.

It will be appreciated that, assuming the pressure angle of the wheel being measured to be known, the lead angle $\beta$ at pitch circle level can readily be calculated from the readings (lead angle $\beta$ at base circle level) given by the devices according to the foregoing embodiments. Alternatively, as will have been apparent from the discussion of Fig. 3 above, the devices described in the foregoing may be so modified that the measuring surface $m$ of the feeler 5 lies in a plane $x$ or $x'$ which forms an angle $\epsilon$ with the plane containing the axis of rotation $y$ or $y'$ of the feeler 5, this angle being made equal to the "normal" pressure angle of the screw wheel teeth (i. e., the pressure angle measured on a tooth section taken normal to the helix forming the tooth). In that case, the instruments, so modified, will give a direct reading of the lead angle $\beta$ at pitch circle level. For example, the angle $\epsilon$ may be made 15°, where the majority of the gear wheels to be tested with any such instrument are likely to have a "normal" pressure angle of 15°.

It will be appreciated that the characteristic features of some of the embodiments described could be applied to others and that many modifications can be made in the construction and arrangement of parts within the scope of the appended claims without departing from the spirit of the invention.

What I claim and desire to secure by Letters Patent is:

1. A device for measuring the lead angle of the teeth of screw wheels, said device comprising in combination at least one screw wheel locating abutment, a slide mounted on said abutment, a casing slidably mounted on said slide, a shaft rotatably mounted on said casing, a feeler connected to said shaft and having a single plane measuring surface, means for sliding said feeler relative to said slide at right angles to the line of movement between the slide and the casing, and protractor means including a stationary and a relatively movable indicating element connected to said casing and said shaft respectively.

2. A device for measuring the lead angle of the teeth of screw wheels, said device comprising in combination at least one screw wheel locating abutment, a slide mounted on said abutment, a casing slidably mounted on said slide, a shaft rotatably mounted on said casing, a feeler outside said casing mounted on said shaft, and having a single plane measuring surface, protractor means within the casing and mounted on said shaft, and a microscope mounted in said casing for observing the protractor from outside the said casing, and provided with a reference index for cooperation with the protractor.

3. A device for measuring the lead angle of the teeth of screw wheels, said device comprising in combination at least one screw wheel locating abutment, a slide mounted on said abutment, a casing slidably mounted on said slide, a shaft rotatably mounted on said casing, a feeler outside said casing mounted on said shaft and having a single plane measuring surface, means for sliding said feeler relative to said slide at right angles to the line of movement between the slide and the casing, protractor means within the casing and mounted on said shaft, and a microscope mounted in said casing for observing the protractor from outside the said casing, and provided with a reference index for cooperation with the protractor.

4. A device for measuring the lead angle of the teeth of screw wheels, said device comprising in combination an abutment member having a plane surface, a casing slidably mounted on said abutment member for motion in a direction at right angles to the said plane surface, a shaft rotatably mounted on said casing, a feeler connected to said shaft and having a single plane measuring surface, and protractor means including a stationary and a relatively movable indicating element connected to said casing and said shaft respectively.

5. A device for measuring the lead angle of the teeth of screw wheels, according to claim 4, characterised in that the feeler has at least two surfaces disposed in the same plane to constitute a single discontinuous measuring surface.

6. A device for measuring the lead angle of the teeth of screw wheels, said device comprising in combination an abutment member having a plane surface, a casing slidably mounted on said abutment member for motion in a direction at right angles to the said plane surface and also along a line parallel to said plane surface, a shaft rotatably mounted on said casing, a feeler connected to said shaft and having a single plane measuring surface, and protractor means including a stationary and a relatively movable indicating element connected to said frame and said shaft respectively.

7. A device for measuring the lead angle of the teeth of screw wheels, said device comprising in combination an abutment member having a plane surface, a casing slidably mounted on said abutment member for motion in a direction at right angles to said plane surface, a shaft rotatably mounted on said casing, a feeler outside said casing mounted on said shaft and having a single plane measuring surface, protractor means within the casing and mounted on said shaft, and a microscope mounted in said casing for observing the protractor from outside the said casing, and provided with a reference index for cooperation with the protractor.

8. A device for measuring the lead angle of the teeth of screw wheels, said device comprising in combination an abutment member having a plane surface, a forked frame slidably mounted on said abutment member for motion in a direction at right angles to said plane surface, a casing displaceably supported in said forked frame and movable in a plane parallel to that of the said surface, a shaft rotatably mounted on said casing, a feeler outside said casing mounted on said shaft and having a single plane measuring surface, protractor means within the casing and mounted on said shaft, and a microscope mounted in said casing for observing the protractor from outside the said casing, and provided with a reference index for cooperation with the protractor.

9. A device for measuring the lead angle of the teeth of screw wheels, said device comprising in combination at least one screw wheel locating abutment for engaging a tooth end face, a casing attached to said abutment, a shaft rotatably mounted on said casing, a feeler outside said casing mounted on said shaft, and having a single plane measuring surface, protractor means within the casing and mounted on said shaft, and a microscope mounted in said casing for observing the protractor from outside the said casing, and provided with a reference index for cooperation with the protractor.

10. A device for measuring the lead angle of the teeth of screw wheels, said device comprising in combination at least one screw wheel locating abutment, a slide mounted on said abutment, a casing slidably mounted on said slide, a shaft rotatably mounted on said casing, a feeler connected to said shaft and having a single plane measuring surface which is disposed in a plane inclined with respect to the axis of rotation of said shaft at an angle equal to a normal screw wheel tooth pressure angle, means for sliding said feeler relative to said slide at right angles to the line of movement between the slide and the casing, and protractor means including a stationary and a relatively movable indicating element connected to said casing and said shaft respectively.

11. A device for measuring the lead angle of the teeth of screw wheels, said device comprising in combination at least one screw wheel locating abutment, a protective enclosing casing attached to said abutment, a shaft rotatably mounted on and passing through a wall of said protective enclosing casing, a feeler outside said casing mounted on said shaft and having a single plane measuring surface, protractor means protectively housed within the protective enclosing casing and mounted on said shaft and a microscope mounted in said protective enclosing casing for observing the protractor from outside the said protective enclosing casing and provided with a reference index for cooperation with the protectively housed protractor.

12. A device according to claim 11 wherein the casing is slidably mounted on a slide attached to the abutment and the feeler is disposed in a plane inclined with respect to the axis of rotation of the shaft at an angle equal to the normal screw wheel tooth pressure angle.

13. A device according to claim 12 wherein the abutment has a plane surface and the casing is slidable in a direction at right angles to said plane surface.

14. A device according to claim 11 wherein the locating abutment is a V-shaped member carried by a splined rod and the casing is attached to said splined rod.

15. A device according to claim 11 wherein the locating abutment consists of two shaft mounting centers supported on a bed, upon which bed the casing is slidably mounted.

16. A device according to claim 15 wherein the feeler is disposed in a plane inclined with respect to the axis of rotation of the shaft at an angle equal to the normal screw wheel tooth pressure angle.

17. A device according to claim 15 wherein the feeler is slidably mounted to move in a plane at right angles to the direction of movement of the casing on the bed.

18. A device for measuring the lead angle of the teeth of screw wheels, said device comprising in combination at least one screw wheel locating abutment for engaging a tooth end face, a protective enclosing casing attached to said abutment, a shaft rotatably mounted on and passing through a wall of said protective enclosing casing, a feeler outside said casing mounted on said shaft and having a single plane measuring surface, protractor means protectively housed within the protective enclosing casing and mounted on said shaft and a microscope mounted in said protective enclosing casing for observing the protractor from outside the said protective enclosing casing and provided with a reference index for cooperation with the protectively housed protractor.

References Cited in the file of this patent

UNITED STATES PATENTS

| Number | Name | Date |
|---|---|---|
| 1,567,134 | Gosnell | Dec. 29, 1925 |
| 1,626,029 | Briggs | Apr. 26, 1927 |
| 1,659,868 | Gildersleeve | Feb. 21, 1928 |
| 2,026,784 | Hansen | Jan. 7, 1936 |
| 2,295,206 | Fraumann | Sept. 8, 1942 |
| 2,367,004 | Chitwood | Jan. 9, 1945 |

FOREIGN PATENTS

| Number | Country | Date |
|---|---|---|
| 460,008 | Great Britain | Jan. 19, 1907 |
| 346,805 | Germany | Jan. 5, 1922 |
| 418,780 | Great Britain | Oct. 31, 1934 |
| 221,968 | Switzerland | June 30, 1942 |
| 875,014 | France | Sept. 3, 1942 |